N. C. COOLEY.
Fruit Drier.

No. 104,559.

Patented June 21, 1870.

Witnesses
Victor Hagmann
C. A. Pettit

Inventor
N. C. Cooley
per Munn & Co
Attorneys

United States Patent Office.

NEWTON C. COOLEY, OF WYOMING, DELAWARE.

Letters Patent No. 104,559, dated June 21, 1870.

FRUIT-DRIER.

The Schedule referred to in these Letters Patent and making part of the same

*To all whom it may concern:*

Be it known that I, DR. NEWTON C. COOLEY, of Wyoming, in the county of Kent and State of Delaware, have invented a new and useful Improvement in Fruit-Driers; and I do hereby declare that the following is a full, clear, and exact description of the same, reference being had to the accompanying drawing forming a part of this specification, in which—

Figure 1:
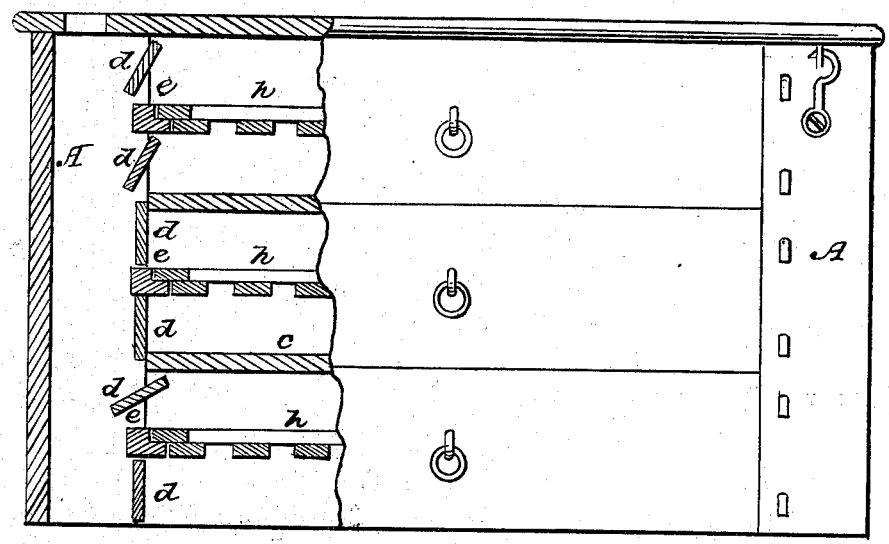
Figure 2:
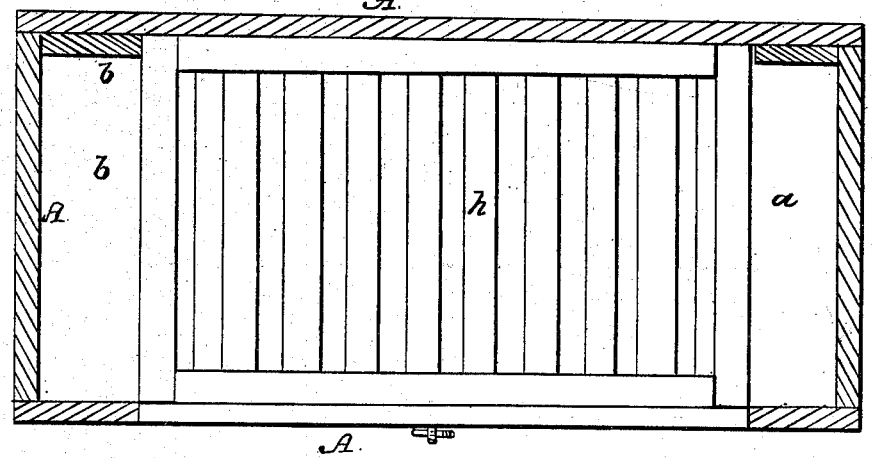

Figure 1 is a sectional elevation, and
Figure 2 is a transverse horizontal section.

This invention consists in a fruit-drying case, provided with partitions that divide it into separate chambers, which communicate at one end with a hot-air flue, and at the other end with an escape passage, leading to a chimney, and which are furnished with screens for holding fruit, malt, hops, or other article to be dried in the current of hot air that sweeps through the chambers, the moisture drawn from the fruit in each chamber being carried off therefrom directly to the chimney without rising through the other chambers and damaging the fruit therein.

In the drawing—

A is the case or house.

$a$, the vertical hot-air flue at one end of the case.

$b$, the vertical escape-passage at the other end of the case.

$c$, the partitions, occupying the whole width of the case, extending from the flue $a$ to the passage $b$, and dividing the case into chambers.

$d$ are valves, two at each end of each chamber, and used for letting in hot air and letting out moisture.

$e$ are ledges, at the ends of the chambers and between the valves, for the support of the screens $h$, on which the article to be dried is placed, the screens being removable like drawers, and being provided with plates at their outer sides, which close the case when the screens are shoved in.

$i$ are swiveling hooks in the front of the case, by which the screens may be fastened in.

As the valves $d$ are arranged, hot air can be let in either beneath the screens or above them, or both, and the moisture may be removed in like manner.

Hot air may also be shut off from either chamber, as is expedient when the same is empty.

The chambers being each entirely separate from the rest, no moisture can find its way into those above it to the damage of the fruit therein, which is an objection to many driers now in use.

Having thus described my invention,

What I claim as new, and desire to secure by Letters Patent, is—

The combination of the case A, hot-air flues $a\ b$, partitions $c$, valves $d$, placed both above and below each partition, ledges $e$, and sliding-screens $h$, all constructed and arranged to operate as described.

To the above specification of my invention I have set my hand this 4th day of May, 1870.

DR. NEWTON C. COOLEY.

Witnesses:
 SOLON C. KEMON,
 CHAS. A. PETTIT.